United States Patent Office 3,472,343
Patented Oct. 14, 1969

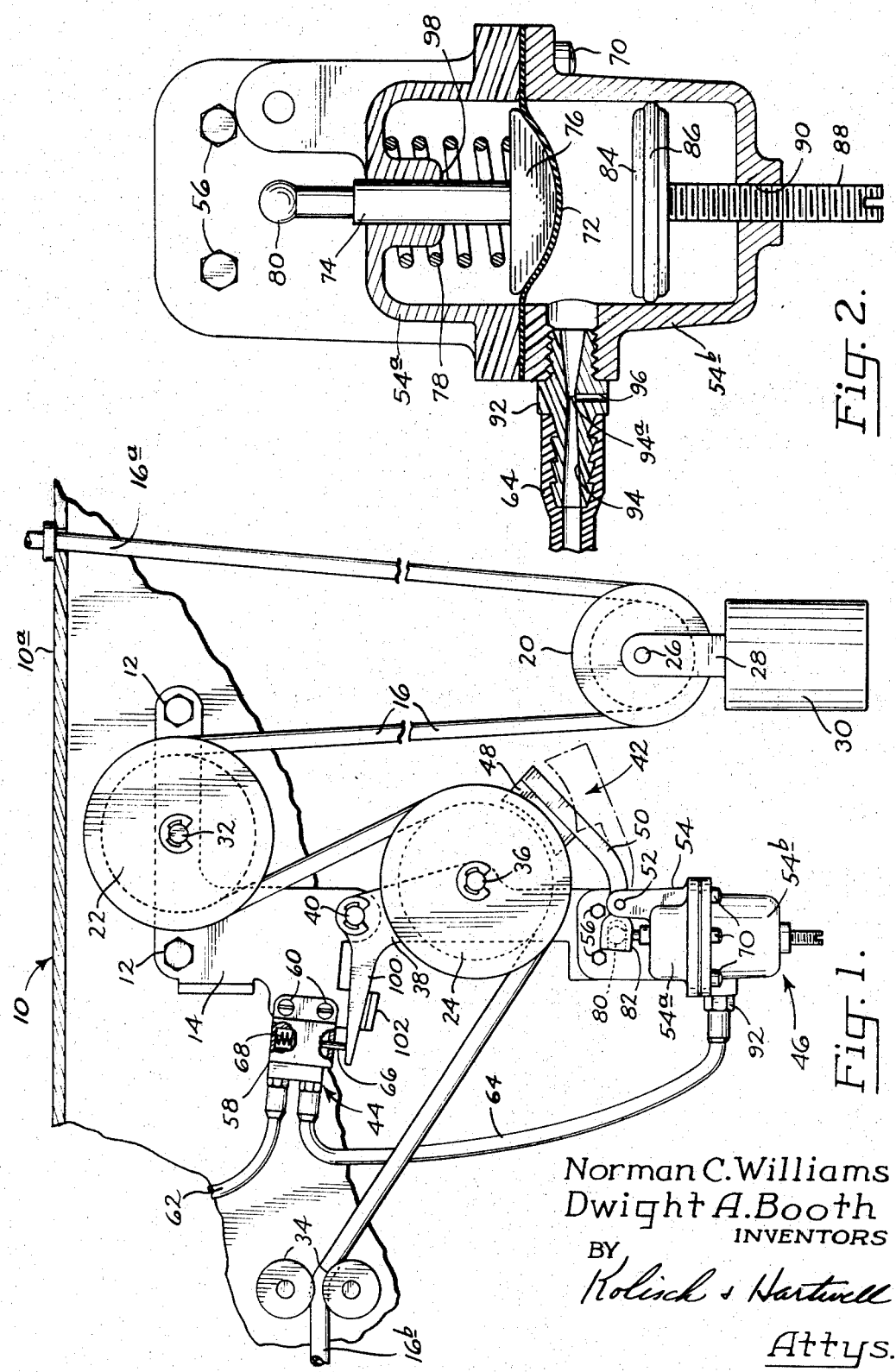

---

3,472,343
APPARATUS FOR CONTROLLING MOVEMENT OF AN ELONGATED ELEMENT
Norman C. Williams and Dwight A. Booth, Portland, Oreg., assignors, by mesne assignments, to Omark Air Controls, Inc., Portland, Oreg., a corporation of Oregon
Filed Aug. 21, 1967, Ser. No. 661,994
Int. Cl. B65h 59/16; B66d 1/48
U.S. Cl. 188—65.1                    10 Claims

ABSTRACT OF THE DISCLOSURE

Control apparatus for an elongated element comprising a releasable brake engaging the element, a fluid-operated motor connected to the brake adapted to release the brake when fluid is supplied to the motor, and a valve controlling the fluid supply. The element is trained over a pulley mounted on a movable mounting, and when the elongated element is tensioned the mounting moves to actuate the valve whereby fluid is supplied to the motor to release the brake. On the supply of fluid being cut off, the escape of fluid from the motor is delayed, with a delay in the re-engagement of the element by the brake.

---

This invention relates to novel apparatus for paying out and retracting an elongated element, and more particularly to such apparatus including means adapted to release a brake from engagement with the elongated element on tensioning of the element as by pulling on it.

A general object is to provide in such apparatus a novel, releasable braking system which senses such tensioning of the element and operates automatically to release a brake in the system on sensing such tensioning.

More specifically, an object is to provide apparatus of the above description featuring a motor which is operatively connected to the brake, which with operation of the motor actuates the brake to release the brake from the elongated element.

Another object is to provide apparatus for controlling movement of an elongated element, which includes means training the element and a mounting for such training means accommodating shifting in its position on tensioning of the element. This shifting in position of the training means is relied upon to release a brake from engagement with the element.

A further object of the invention is to provide apparatus as described, including a releasable brake which engages the elongated element, constructed so that on tensioning of the element, the brake is released and on relaxation of tension in the element a time interval elapses before the brake re-engages the element.

In a specific and preferred embodiment of the invention, on the element being sharply tensioned by an abrupt pull being exerted on one end, the brake is fully released with a time interval being required for the brake to re-engage upon subsequent relaxation of tension. Upon the element being tensioned with a slight gradual pull, the brake is only partially released and the brake on relaxation of tension re-engages the element more rapidly.

A more specific object of the invention is to provide, in means for paying out and retracting an elongated element, a releasable braking system for the element in which a fluid-operated motor actuates the brake to release it with fluid under pressure supplied the motor and wherein said motor actuates the brake to cause re-engagement of the element on the supply of fluid under pressure being cut off from such motor. The motor preferably has an inlet which provides for the rapid inflow of fluid under pressure to the motor to produce rapid brake release. However, exhaust from the motor is provided by a constricted exhaust passage which restricts the escape of fluid from the motor producing a delay in the re-engagement of the brake upon the supply of fluid being cut off.

A specific and preferred embodiment of the invention comprises apparatus for letting out and taking in a hollow hose of the type employed by dentists in performing tooth repair and other operations in a patient's mouth. For instance, the hose might be used with an evacuator for substances in the mouth, and as such would have one end connected to a source of vacuum. In performing work, a dentist's attention is principally directed to the patient's mouth and he has little time to spend in making careful adjustments in the hose which connects with any mouth evacuator. With the apparatus of the invention, the dentist may easily make exact adjustments in the amount of hose which he has extended from his dentist stand, with a gentle pulling on the hose serving to extend the exact amount of hose needed, and with such length of hose remaining payed out upon cessation of such slight pulling effort. When the need for the evacuator instrument is ended the dentist or his assistant may readily cause the entire hose to retract by exerting a somewhat sharper pull on the hose and then freeing the same for automatic retraction. All of such operations may be done by feel alone and with the direction of minimum attention to the unit. The invention, while described in connection with the controlling of a hose in a stand, may have utility in other applications and it is not intended in all instances to be limited to such specific fields of use.

Various other novel features and objects of the invention will become apparent as the following description is read in conjunction with the accompanying drawings, wherein:

FIG. 1 is an elevation of apparatus as contemplated, constructed according to an embodiment of the invention, such apparatus including an elongated hose, means including pulleys training such hose, a brake actuatable to come against the hose and hold it, and a fluid-operated motor connected to the brake for controlling brake movement; and FIG. 2 is an enlarged view of the fluid-operated motor shown in FIG. 1 with its front half broken away better to show the internal mechanism.

Referring now to the drawings, and more particularly to FIG. 1, at 10 is indicated generally portions of a housing in a dental stand, and within and secured to housing 10 by fasteners 12 is a support frame 14.

A conduit or hose for supplying vacuum to an evacuator is shown at 16. Hose 16 has end 16a anchored to top wall 10a of the housing. In a dental stand this end of the hose is connected to a source of vacuum (not shown). Within housing 10, hose 16 is trained about three pulleys, shown at 20, 22 and 24.

Pulley 20 is journaled at 26 on a bracket 28 fastened to the top of a weight 30. The hose between where it is anchored to wall 10a and where it travels about pulley 22 extends in a depending loop with pulley 20 carried in the base of such loop. Weight 30 is thus suspended by the hose and functions as a gravity-operated biasing means tending to retract the hose into the housing.

Hose 16 on leaving pulley 20 extends upwardly and thence in a reverse bend about pulley 22. This pulley is journaled at 32 on support frame 14.

Hose 16 on leaving pulley 22 extends downwardly and in a reverse bend about pulley 24, which is shown below and somewhat to the left of pulley 22 in FIG. 1. On leaving pulley 24 the hose extends upwardly and to the left and through guides such as the guide rolls shown at 34 to an end 16b, which is outside the housing and is provided with means (not shown) for attaching the hose to an evacuator or other vacuum-operated instrument. Pulley 24 is journaled at 36 on a mounting 38 and this mounting in turn is journaled at 40 for rotation relative to support frame 14. Thus, the mounting for pulley 24 is not stationary as is the mounting for pulley 22, but instead may partake of pivotal movement with the mounting swinging about the axis provided by journal 40. With journal 36 being below and somewhat to the right of journal 40, on tensioning of the hose such as occurs on pulling on end 16b to cause paying out of the hose, a force results tending to swing the mounting in a clockwise direction in FIG. 1.

According to this invention a releasable braking system is provided, including a brake 42, which engages the hose to hold the same in a given position. On end 16b of the hose being pulled upon, tension results in the hose which is sensed by a control means 44, which operates an actuating means, shown generally at 46, whereby the brake is released.

Further describing these features of the invention, brake 42 includes a shoe 48 shaped to fit the contour of the hose where it extends about pulley 24. The shoe is mounted on arm 50, pivotally mounted at 52 on housing structure 54, which is secured to mounting 38 by fasteners 56.

Control means 44 comprises a valve 58 secured to support frame 14 by fasteners 60. The valve is a conventional valve and regulates the flow of fluid under pressure, specifically air, between a supply conduit 62 and a conduit 64. The valve includes the usual spool partially shown at 66, which is biased by a spring 68 to a position to close the valve to cut off conduit 62 from conduit 64. With movement of the valve spool inwardly into the valve, the valve is opened with the degree of opening depending upon the extent to which the spool is shifted inwardly.

Actuating means 46 comprises a fluid-operated motor and more specifically an air pressure operated extensible motor. Considering the construction of such motor in more detail, and referring both to FIGS. 1 and 2, housing structure 54 includes top and bottom bell sections 54a, 54b, joined together by fasteners 70. Dividing the interior of the space within the bell sections is a diaphragm 72. Mounted for reciprocation in upper bell section 54a is a plunger 74 with a head 76 resting against the top of the diaphragm. Biasing the plunger downwardly and interposed between the head and bell section 54a is a coil compression spring 78.

The top of plunger 74 includes a ball 80 received within a socket 82 integral with the end of arm 50. The ball and socket connection between the plunger and arm connects the two parts so that on upward movement of the plunger the right end of the arm and brake shoe 48 moves away from the hose to a release position shown in phantom outline in FIG. 1, and conversely, on downward movement of the plunger the right end of the arm moves upwardly to shift the brake shoe against the exterior of the hose to place the brake in the braking position illustrated in solid outline in FIG. 1.

Within the space bounded by the bell sections 54a, 54b and below the diaphragm is a piston element 84 mounting a seal 86 which seals the piston to the interior of bell section 54b. The piston is journaled on the top end of a threaded shaft 88, such shaft being screwed into an internally threaded bore 90 provided at the base of bell section 54b. With turning of the shaft the piston may be raised and lowered to vary the size of the space for holding fluid under pressure, i.e., air, existing between the diaphragm and the top of the piston.

Mounted on one side of bell section 54b is a nipple 92 with a passage 94 extending therethrough. Conduit 64 has one end mounted over the protruding outer portion of nipple 92 and passage 94 connects the interior of the conduit with the space within bell section 54b bounded by the diaphragm and piston 84. Passage 94, it will be noted, tapers progressing inwardly from opposite ends to a constricted region 94a. Communicating with the passage adjacent constricted region 94a is a vent passage 96 which has its opposite end communicating with the atmosphere.

By reason of such a construction on air under pressure first being introduced to conduit 64 and passage 94, most of such air passes through the passage to enter the space below the diaphragm to produce upward deflection of the diaphragm, with minimal loss of air through the vent passage. On the supply of air to conduit 64 being cut off, vent passage 96 provides for the exhausting of air from the space within bell section 54b below the diaphragm.

On air under pressure being introduced through conduit 64 into the space below the diaphragm, such causes the diaphragm to deflect upwardly with upward movement of the plunger and compression of spring 78. Upward movement continues until the top of head 76 strikes against shoulder 98. Passage 94 is of sufficient size so that with the pressure of air used, upward movement of the diaphragm to the extent permitted by shoulder 98 occurs relatively rapidly. Vent passage 96 throttles the exhaust of air below the diaphragm on the supply of air under pressure to conduit 64 being cut off, so that downward movement of the plunger and diaphragm under the urging of spring 78 takes place at a slower speed. The motor which has been described, which is an extensible and contractible type of motor, thus contracts over a definite time interval with vent passage 96 constituting delay means delaying the contraction of the motor. The exact amount of time required for contraction of the motor is adjustable by adjusting the position of the piston within bell section 54b, since such change in position in the piston reflects the volume of air which fills up within the bell section and the time that it takes for such air to exhaust from the bell section.

Referring now to FIG. 1, joined to mounting 38 and projecting to the left of the mounting in FIG. 1 is an arm 100. Such arm extends under valve 58 and valve spool 66 discussed in connection with that valve. With swinging of mounting 38 in a clockwise direction in FIG. 1, arm 100 moves upwardly against the valve to depress the valve spool. Spring 68 biasing the valve spool outwardly urges the arm downwardly in FIG. 1 to a limit position defined by stop 102 which is integral with support frame 14.

Explaining the operation of the apparatus, normally, and prior to tension being applied to the hose, valve 58 is closed, and the source of air is cut off to motor 46, spring 78 within motor 46 is fully extended to the limit permitted by diaphragm 72, and arm 50 mounting shoe 48 is positioned with the shoe snugly against the exterior of the hose where trained about pulley 24. To extend the hose a pull is exerted on exposed end 16b to tension this portion of the hose. On such tensioning of the hose a force is imparted to mounting 38 urging the mounting in a clockwise direction with arm 100 moving upwardly against the valve spool.

If only a slight steady pull is exerted on end 16b only slight movement takes place in mounting 38, with valve 58 as a consequence being cracked open only slightly. This results in air under pressure at reduced volume being supplied to motor 46 producing upward movement of the diaphragm and compression of spring 78 whereby the brake arm is moved to swing the brake shoe away from the hose. Flow conditions are such that only a slight pressure of air builds up within bell section 54b, and as a consequence the brake shoe moves only partially away from the hose and may even with only slight tension applied to the hose not even completely clear the hose. With such conditions existing it is possible easily to pull the hose out to the extent desired with such moving smoothly from the stand. On the relaxation of pulling effort, the brake shoe substantially immediately moves back to firm engagement with the hose, so that there is little perceptible retraction of the hose under the biasing of weight 30, and the amount of hose extended from the stand remains substantially unchanged.

To produce retraction of the hose, all that is necessary is to exert a somewhat sharper pull on exposed end 16b whereby greater swinging movement results in the mounting and valve 58 is more fully opened. This will result in the brake shoe moving completely clear of the hose, and by reason of the delay feature noted in connection with the contraction of motor 46, the brake shoe does not move back to re-engage the hose firmly for a definite time interval. During this time interval, if the exposed end of the hose is released, weight 30 will pull the hose back to retract the same into the stand. A dentist or other operator of the equipment is quickly able to sense, with any use of the apparatus, the type of pulling effort required to permit gradual extension of the hose, to permit retraction of only a short length, or to permit full retraction of the hose.

Apparatus as contemplated operates extremely smoothly with no requirement of specific external hose deflections or of feeling of engagement of mechanical locking parts necessary to stop the hose. Thus, it is ideally suited for a dental stand where it is desirable that the hose movement take place with minimal effort and attention required for controlling the hose.

The specific and preferred embodiment of the invention illustrated utilizes air under pressure energizing the motor. Such is desirable in dental offices where a source of air under pressure is available.

While a preferred embodiment of the invention has been illustrated, it is realized that changes and variations are possible, both in the specific components of the apparatus and in their interrelation in the apparatus without departing from the invention.

It is claimed and desired to secure by Letters Patent:

1. In apparatus for paying out and retracting an elongated element having a support frame and biasing means urging retractive movement of the element relative to said frame, a releasable braking system comprising a brake having a braking position releasably engaging such element thus to secure the element, a fluid-operated motor connected to said brake and actuatable to shift said brake between its said braking position and a release position, and control means controlling the supply of fluid to said motor, said control means being responsive to the tensioning of the element such as occurs on pulling on the element to cause it to be payed out to produce shifting of said brake toward its release position.

2. The apparatus of claim 1, wherein said control means comprises a valve which regulates the flow of fluid to said motor, said valve having means biasing it to a normally closed position which prevents fluid flow to the motor.

3. The apparatus of claim 1, wherein said control means further comprises means training such elongated element at a point intermediate its ends which the element travels against during the paying out thereof, a mounting for said training means accommodating movement thereof on tensioning of such element, and a device responsive to such movement effecting actuation of said control means.

4. The apparatus of claim 3, wherein said mounting comprises a member which is journaled on said support frame, which rotates on tension being applied to such element, and said device comprises an arm connected to said mounting which on rotation of said mounting actuates said control means.

5. The apparatus of claim 1, wherein said control means is operable on relaxation of tension in the element to produce shifting of the brake toward its said braking position, and which further comprises delay means, operable on such relaxation of tension to delay the shifting of said brake to its braking position.

6. The apparatus of claim 1, wherein said motor is extensible and contractible, said control means comprises a valve which on tensioning of the element operates the motor in one direction to produce shifting of the brake to its release position and upon relaxation of such tensioning operates the motor in the opposite direction to produce shifting of the brake to its braking position, and which further includes delay means operable on relaxation of such tensioning to delay the shifting of said brake to its braking position.

7. The apparatus of claim 6, wherein said valve is adjusted to supply fluid to said motor on such tensioning of such element, and adjusted to shut off the supply of fluid to said motor on relaxation of such tensioning, and said delay means comprises means defining a restricted passage accommodating the exhaust of fluid from said motor on the supply of fluid to the motor being shut off.

8. The apparatus of claim 1, wherein said control means comprises a valve, means training such elongated element at a point intermediate its ends over which such element travels during the paying out thereof, and a mounting for said training means accommodating movement thereof on tensioning of such element; said fluid-operating motor and said brake being mounted on said mounting; said mounting accommodating movement thereof on tensioning of such element.

9. In apparatus for paying out and retracting an elongated element having a support frame and biasing means urging retractive movement of the element relative to said frame, a releasable braking system comprising a brake having a braking position where it releasably engages such element thus to secure the element, actuating means for said brake for shifting the brake between its said braking position and a release position, control means for said actuating means producing shifting of said brake toward its release position in response to tensioning of such element such as occurs on pulling on the element to cause it to be payed out, said control means producing shifting of said brake toward its said braking position on relaxation of tension in such element, and delay means operable on relaxation of tension in such element to delay the shifting of said brake to its braking position.

10. The apparatus of claim 9, wherein said delay means is adjustable to vary the period of delay.

References Cited
UNITED STATES PATENTS

| | | | |
|---|---|---|---|
| 3,095,183 | 6/1963 | Le Bus | 188—65.1 |
| 3,237,729 | 3/1966 | Proctor | 188—188 X |
| 3,240,510 | 3/1966 | Spouge | |

DUANE A. REGER, Primary Examiner

U.S. Cl. X.R.
242—156.1; 254—175